United States Patent Office 2,775,329
Patented Dec. 25, 1956

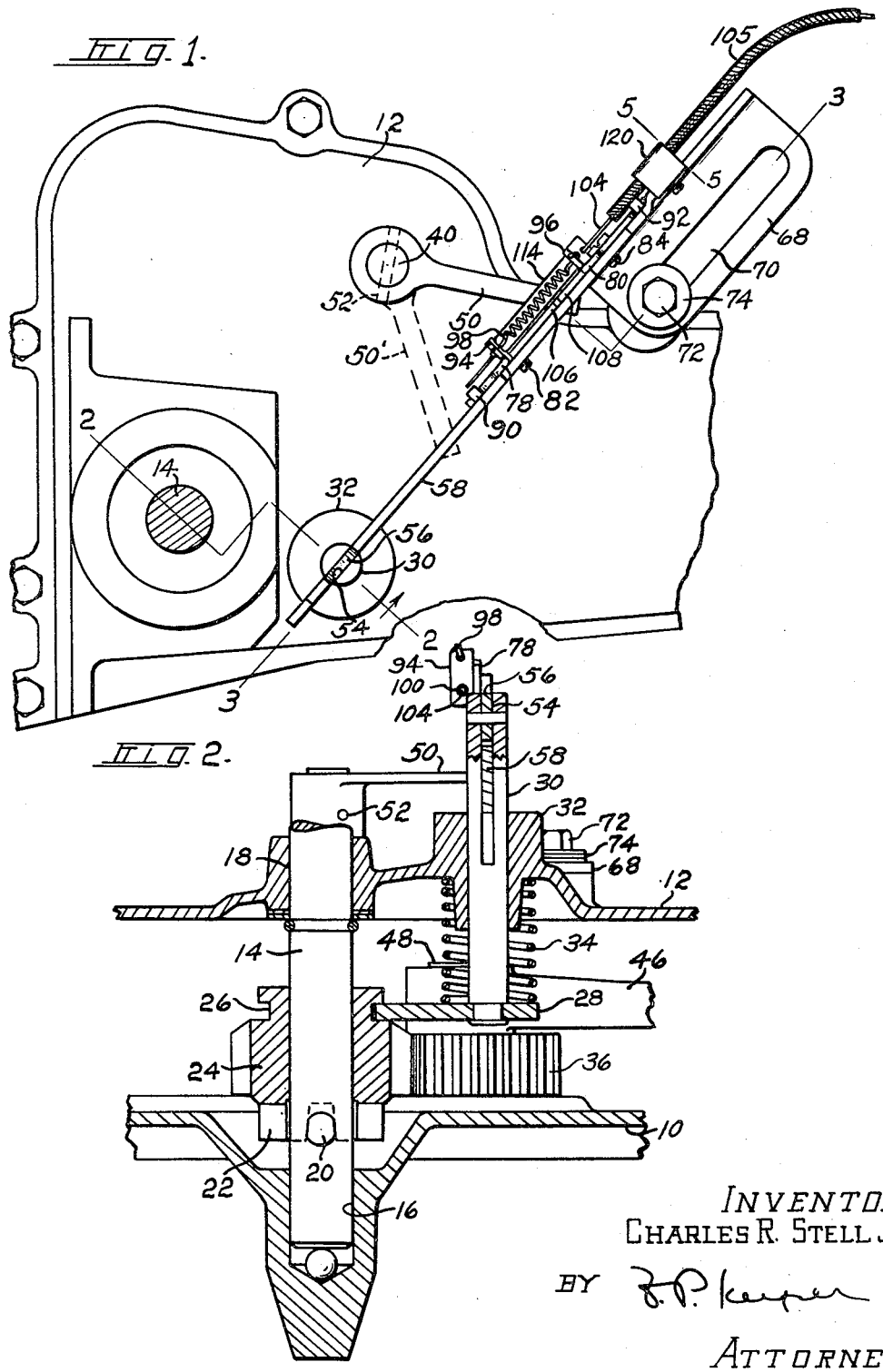

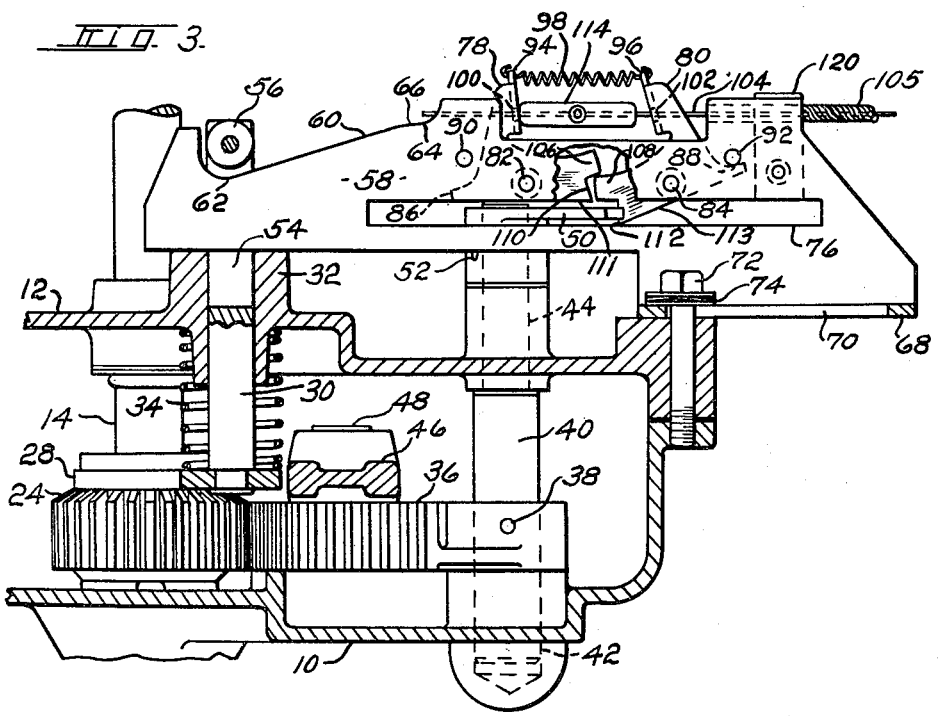

2,775,329

POWER CLUTCH ACTUATORS

Charles R. Stelljes, Fayetteville, N. Y., assignor, by mesne assignments, to The Murray Corporation of America, Detroit, Mich., a corporation of Delaware Application May 7, 1953, Serial No. 353,656

9 Claims. (Cl. 192—82)

This invention relates to power clutch actuators, and as developed, pertains to the use of power-driven oscillatory motion in a washing machine transmission to actuate the clutch in the oscillating agitator drive.

In Patent 2,627,175, a washing machine transmission is shown having an oscillating sector gear driving a pinion adapted to be clutched to an agitator shaft. In such transmissions, it is desirable that the motor run continuously and that mechanism be provided for engaging or disengaging the clutch so that the agitation may be stopped at will. Such clutches, because of the oscillatory movement, are required to be positive and rugged in construction, and when manual means are provided to actuate the same, considerable manual effort is required, usually requiring cumbersome levers or the like.

It is an object of the present invention to employ the oscillatory motion of the power-driven sector gear to actuate the clutch by power, and to control the actuation by relatively light manual or other means. The invention further has to do with the provision of clutch-actuating means which may be shifted by the power oscillatory movement of the sector gear, by manual tripping means providing substantially effortless control. The invention is further directed to a control and actuating construction which there are no relatively moving parts in running engagement, except as when a clutch actuation is being effected.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a fragmentary top plan view of the control mechanism applied to a washing machine transmission;

Figure 2 is a sectional view taken substantially on the broken line 2—2 of Figure 1;

Figure 3 is a sectional view taken substantially on the broken line 3—3 of Figure 1;

Figure 4 is a fragmentary detailed elevational view with parts broken away, showing the mechanism of Figure 3 in reversed position; and Figure 5 is a sectional view taken substantially on the line 5—5 of Figure 1.

In Patent No. 2,627,175, there is shown a washing machine transmission having a sector gear driven by an eccentric and connecting rod, in constant mesh with a pinion journaled on a vertical oscillatory agitator drive shaft. The pinion is castellated on one end and adapted to engage, or be disengaged from, a cross pin in the agitator shaft. Manual operable means are also disclosed which axially shift the pinion on the agitator shaft in order to couple or uncouple the pinion from the shaft cross pin, while the pinion remains in constant mesh with the constantly oscillating power-driven sector gear.

Referring herein to Figures 1, 2, and 3, there is shown power mechanism for axially shifting the pinion referred to in the aforesaid construction. The transmission casing, comprising bottom and top walls 10 and 12, respectively, is provided with an agitator shaft 14 journaled as at 16 and 18 in the bottom and top walls, respectively. The shaft 14 is provided with a cross pin 20 adapted to engage with the castellated end 22 of the axially shiftable driven pinion 24. The pinion 24 is provided with an annular groove 26 cooperating with a yoke member 28 mounted upon a plunger shaft 30, slidably mounted in a boss 32 in the transmission cover or top wall 12. A compression spring 34 is positioned around the plunger 30 and bears against the yoke member 28 and the under surface of the cover 12. Such spring biases the pinion toward the position shown in Figures 2 and 3, wherein a pair of opposed notches in the castellated end 22 of the pinion 24 embrace the cross pin 20 in the shaft 14 for positive drive.

The pinion 24 is oscillatably driven by a sector gear 36, which is pinned as at 38 to a stub shaft 40 journaled as at 42 and 44 in the bottom and top transmission walls, respectively. The sector gear 36 is caused to oscillate by a crank, eccentric or cross head (not shown) connecting with a pitman arm 46 pivoted as at 48 on the sector gear 36. The stub shaft 40 projects through the cover plate 12, and is provided with an actuating arm 50 pinned as at 52 to the upper end of the stub shaft 40. As the sector gear oscillates to and fro, it will be seen that the arm 50 rocks from the position shown in Figure 1 to the dotted position 50' shown in Figure 1.

The upper end of the plunger 30 is forked as at 54 and provided with a cam roller 56 in its upper end. A cam bar 58 projects between the forked ends of the plunger 30 and beneath the roller 56. Such bar slides on the upper end of the boss 32 and is provided with a cam surface 60 having a clutch-engaged lower end 62 and a clutch-disengaged end 64. It will be seen that by moving the bar 58 to the left from the position shown in Figure 3, the roller 56 will be engaged by the cam surface 60 and moved up onto the cam end 64, the cam being provided with a slight step as at 66 to form a rest for the roller 56 free of any tendency to move the cam bar 58 when the roller 56 and plunger 30 are in raised position.

The cam bar 58 is provided at its other end with a support flange 68 having an elongated slot 70 slidably mounted upon a stud bolt 72, mounted in the transmission casing. The bolt may have resilient washers 74 bearing against the flange 68 to provide a snug sliding support for the cam bar 58. The bar 58 has an elongated slot 76 in the main body portion thereof into which the oscillating arm 50 projects. The slot is of sufficient length so as to clear the oscillatory movement of the arm 50, whether the cam bar 58 is in the position shown in Figure 3 or the clutch-disengaged position referred to.

Mounted on the bar 58 are a pair of interengaging dogs 78 and 80, said dogs being pivoted as at 82 and 84. Each of the dogs are provided with stop ears 86 and 88 adapted to engage stop pins 90 and 92 in the cam bar 58. Each of the dogs are provided with upstanding arms 94 and 96 extending at right angles to the plane of the cam bar 58. Such arms are connected together by a light tension spring 98 and are provided with small apertures 100 and 102 through which there is threaded a flexible control cable 104. The dogs have interengaging tongues 106 and 108 and shoulders 110 and 112, either of the latter being adapted to extend across the slot 76 of the cam bar 58 and into the path of the oscillating arm 50.

As shown in Figure 3, the dog 80 is rotated counterclockwise to its end position with the ear 88 engaging the stop pin 92 and the shoulder 112 lying across the slot 76. The arm 50 is shown at the right hand end of its movement, and in its oscillatory movement, moves away from the shoulder 112 toward the left hand end of the slot 76. In such position of the cam bar 58, the pinion 24 is in the engaged position with respect to the cross pin 20 and oscillatory drive is transmitted to the agitator shaft 14.

If it be desired to release the pinion 24 from the cross pin 20 and stop the agitator drive, the dog 80 is rotated clockwise by a pull on the cable 104, such cable having intermediate the arms 94 and 96 a sleeve 114 which will engage the arm 96, causing the dog 80 to swing clockwise to the position shown in Figure 4. In swinging to the position shown in Figure 4, the tongue 108 of the dog 80 lifts the tongue 106 of the dog 78 until the tongue 108 is rocked clockwise sufficiently to clear the tongue 106, whereupon the spring 98 rocks the dog 78 clockwise to the position shown in Figure 4. In the position shown in Figure 4, the shoulder 110 of the dog 78 lies in the path of movement of the arm 50, so that upon movement of the arm 50 to the left to the position 50' (see Figure 1), the cam bar 58 is moved from the position shown in Figure 3 to the left to the other position, the cam 60 engaging the roller 56 and lifting the plunger 30. At the end of the movement, the roller 56 rests in the step 66 and the pinion 24 is axially slid along the shaft 14 so as to clear the cross pin 20. It will be appreciated that the movement of the pinion 24 is such as to disengage the castellated end of the pinion from the cross pin 20, but the movement is insufficient to move the pinion 24 from mesh with the sector gear 36.

When it is desired to reengage the pinion 24 with the cross pin 20, the flexible cable 104 is moved to the left from the position shown in Figure 4, so as to cause sleeve 114 to rock the dog 78 counterclockwise from the position shown in Figure 4. The tongue 106 of the dog 78 lifts the tongue 108 of the dog 80 until the tongues clear one another, whereupon the spring 98 rotates the dog 80 counterclockwise back to the position shown in Figure 3. Since the cam bar 58 is in the left hand position previously referred to, the shoulder 112 of the dog will lie in the path of movement of the arm 50 as it swings from the dotted position 50' to the full line position 50 (see Figure 1). Thus, the cam bar 58 will be moved from its left hand position to the position shown in Figure 3, allowing the compression spring 34 on the plunger 30 to reengage the castellated end 22 of the pinion 24 with the cross pin 20. The flexible cable 104 is housed in a flexible conduit 105, the end of the latter being clamped rigidly to the cam bar 58 by a clamp 120. Such cable and conduit are flexible, and will extend to a suitable control station, whereby the relative movement between the cable and conduit may be manually effected to move the sleeve 114 and actuate the dogs 80 and 78 in the manner described to provide for the power sliding movement of the pinion 24 on the shaft 18.

It will be observed that each of the dogs 78 and 80 have inclined surfaces 111 and 113 to the rear of the respective shoulders 110 and 112, so that should the shoulder of one of the dogs be positioned in the path of the oscillating arm 50, while such arm is on the other side of the shoulder, the first movement of the arm 50 to the position shown, for example, in Figure 4, will pivot the dog so positioned against the urge of the spring 98, so as to lift the shoulder temporarily. Upon the return movement of the arm 50, engagement with the shoulder of the dog will be effected, resulting in the power shift of the cam bar 58. It will be seen from the foregoing description that except during the actual shifting of the pinion clutch between the engaged and disengaged positions, all of the parts are at rest, the arm 50 swinging freely in that part of the slot 76 embracing the arc of movement of the arm 50, depending on whether the cam bar 58 is in the engaged or disengaged position. By simple movement of the control cable 104 with respect to the conduit 105, the dogs are caused to reverse their position and provide power movement of the cam bar 58. The cable and conduit having moderate flexibility, freely permit movement of the cam bar 58 without interfering in any way with the manual control, as will be well understood in the art. While a cable conduit mechanical control is shown, it will appear that solenoid operation could equally well be applied.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a power clutch actuator, a power-driven oscillating member, a clutch actuating member movable between a clutch-engaged and a clutch-disengaged position, means movable by said oscillating member to actuate said clutch-actuating member between said positions said means having opposed movable means carried thereon adapted to be projected into the path of movement of said oscillatory member, and means for effecting movement of one or the other of said opposed means into the path of said oscillating member.

2. In a washing machine transmission, a casing having a top wall, a clutch-actuating rod slidably mounted in and projecting through said wall, and having a cam follower on its end, a power-driven oscillating stub shaft projecting through said wall, and having a radial arm keyed thereto, a bar mounted for sliding movement on said wall, having a cam adapted to engage said follower, and disposed in chordal relation with respect to the arc of movement of said arm, a pair of pivotal members mounted on said bar, each having a shoulder adapted to project into the path of movement of said arm, and means for projecting one or the other of said shoulders at will into said path.

3. In a washing machine transmission, a casing having a top wall, a clutch actuating rod slidably mounted in and projecting through said wall, and having a cam follower on its end, a power-driven oscillating stub shaft projecting through said wall, and having a radial arm keyed thereto, a bar mounted for sliding movement on said wall, having a cam adapted to engage said follower, and disposed in chordal relation with respect to the arc of movement of said arm, a pair of pivotal members mounted on said bar, each having a shoulder adapted to project into the path of movement of said arm, and interengaging means on said members whereby one or the other of said shoulders may at will be projected into the said path by pivotal actuation of the other member.

4. In a washing machine transmission, a casing having a top wall, a clutch actuating rod slidably mounted in and projecting through said wall, and having a cam follower on its end, a power-driven oscillating stub shaft projecting through said wall, and having a radical arm keyed thereto, a bar mounted for sliding movement on said wall, having a cam adapted to engage said follower, and disposed in chordal relation with respect to the arc of movement of said arm, a pair of pivotal members mounted on said bar, each having a shoulder adapted to projected into the path of movement of said arm, interengaging tongues on said members whereby one or the other of said shoulders may at will be projected into the said path by pivotal actuation of the other member to retract the shoulder thereof from the path, and resilient means for urging both members to a pivotal position with said shoulders in said path.

5. In a washing machine transmission, a casing having a top wall, a clutch-actuating rod slidably mounted in and projecting through said wall, and having a cam follower on its end, a power-driven oscillating stub shaft projecting through said wall, and having a radial arm keyed thereto, a bar mounted for sliding movement on said wall, having a cam adapted to engage said follower, and disposed in chordal relation with respect to the arc of movement of said arm, a pair of pivotal members mounted on said bar, each having a shoulder adapted to project into the path of movement of said arm, interengaging tongues on said members whereby one or the other of said shoulders may at will be projected into the said path by pivotal actuation of the other member, and resilient means connecting said members and adapted to urge said members into pivotal position to project said shoulders into said path.

6. In a washing machine transmission, a casing having a top wall, a clutch-actuating rod slidably mounted in and projecting through said wall, and having a cam follower on its end, a power-driven oscillating stub shaft projecting through said wall, and having a radial arm keyed thereto, a bar mounted for sliding movement on said wall, having a cam adapted to engage said follower, and disposed in chordal relation with respect to the arc of movement of said arm, a pair of pivotal members mounted on said bar, each having a shoulder adapted to project into the path of movement of said arm, interengaging tongues on said members whereby one or the other of said shoulders may at will be projected into the said path by pivotal actuation of the other member to retract the shoulder thereof from the path, resilient means for urging both members to a pivotal position with said shoulders in said path, and control means for selectively rocking either member to retract the shoulder thereof from the path and disengage said tongues, whereby the shoulder of the other member is moved to a position in said path.

7. In a washing machine transmission, a casing having spaced top and bottom walls, a vertical agitator shaft projecting through the top wall and journaled in the bottom wall, a pinion having a castellated end slidably mounted on said shaft between said walls, a cross pin in said shaft adapted to be engaged by the castellated end of said pinion, a section gear within said casing pinion and having a stub shaft keyed thereto projecting through the top wall, said sector gear meshing with said pinion, means for oscillating said sector gear, an arm fixed to said stub shaft above said top wall, yoke means adapted to slide said pinion on the agitator shaft having a rod projecting through and slidably mounted in the top wall, a bar mounted to slide on the top wall and having a chordal relation to the arc of oscillatory movement of said arm, cam and follower means associated with said rod and bar, whereby movement of said bar between two positions actuates said rod to move said pinion into and from engagement with said cross pin, and detent means carried by said bar and adapted to be moved at will into the path of movement of said arm, whereby to shift said bar from one position to the other by movement of said arm.

8. In a washing machine transmission, a casing having spaced top and bottom walls, a vertical agitator shaft projecting through the top wall and journaled in the bottom wall, a pinion having a castellated end slidably mounted on said shaft between said walls, a cross pin in said shaft adapted to be engaged by the castellated end of said pinion, a sector gear within said casing pinion and having a stub shaft keyed thereto projecting through the top wall, said sector gear meshing with said pinion, means for oscillating said sector gear, an arm fixed to said stub shaft above said top wall, yoke means adapted to slide said pinion on the agitator shaft having a rod projecting through and slidably mounted in the top wall, a bar mounted to slide on the top wall and having a chordal relation to the arc of oscillatory movement of said arm, cam and follower means associated with said rod and bar, whereby movement of said bar between two positions actuates said rod to move said pinion into and from engagement with said cross pin, and detent means carried by said bar and adapted to be moved at will into the path of movement of said arm, whereby to shift said bar from one position to the other by movement of said arm, said detent means comprising a pair of members pivotally mounted on said bar having interengaging tongues and shoulders adapted to be moved into and be retracted from the path of movement of said arm.

9. In a power clutch actuator, a power-driven oscillating radial arm, a clutch actuator movable between a clutch-engaged and a clutch-disengaged position, a slidable bar movable by said oscillating arm to actuate said clutch-actuator between said positions, said bar having a portion thereof disposed in chordal relation to the arc of movement of said oscillating arm, opposed abutment members pivotally mounted on said bar, each of said members having an abutment adapted to be swung into the path of movement of said arm, and a tongue, each of said tongues projecting toward one another and into the path of movement of the other, resilient means for urging each of said members toward a position with its abutment in the path of movement of said arm, and means for pivotally moving either member against said resilient means to remove the abutment thereof out of the path of said arm, and pivot the other member through said tongues until the respective paths of movement of said tongues separate, whereby said other member is moved by said resilient means to a position with its abutment in the path of movement of said arm.

References Cited in the file of this patent

UNITED STATES PATENTS

| | | |
|---|---|---|
| 2,502,682 | Wagenknecht | Apr. 4, 1950 |
| 2,625,248 | Geldhof | Jan. 13, 1953 |